United States Patent
Lin et al.

(10) Patent No.: US 7,586,482 B2
(45) Date of Patent: Sep. 8, 2009

(54) METHOD AND RELATED WIRELESS MOUSE FOR DECREASING DELAY TIME OF DATA PACKET TRANSMISSION SYSTEM

(75) Inventors: Bi-Hui Lin, Hsin-Chu Hsien (TW); Chin-Hsin Yang, Hsin-Chu Hsien (TW); Chin-Chou Lee, Hsin-Chu Hsien (TW); Chun-Huang Lin, Hsin-Chu Hsien (TW); Wen-Yu Yang, Hsin-Chu Hsien (TW)

(73) Assignee: PixArt Imaging Inc., Hsin-Chu Hsien (TW)

( * ) Notice: Subject to any disclaimer, the term of this patent is extended or adjusted under 35 U.S.C. 154(b) by 777 days.

(21) Appl. No.: 11/308,241

(22) Filed: Mar. 14, 2006

(65) Prior Publication Data

US 2006/0181513 A1      Aug. 17, 2006

Related U.S. Application Data

(63) Continuation-in-part of application No. 10/908,076, filed on Apr. 27, 2005, now Pat. No. 7,466,305.

(30) Foreign Application Priority Data

Dec. 31, 2004   (TW) .............................. 93141788 A

(51) Int. Cl.
*G06F 3/033*    (2006.01)
*G06F 3/00*     (2006.01)
*G06F 13/12*    (2006.01)
*G06F 13/38*    (2006.01)
*G09G 5/08*     (2006.01)

(52) U.S. Cl. ...................... 345/163; 345/164; 345/165; 345/166; 710/30; 710/62

(58) Field of Classification Search ......... 345/156–184; 710/30, 62–74; 714/701, 708
See application file for complete search history.

(56) References Cited

U.S. PATENT DOCUMENTS

| 6,772,236 | B1 * | 8/2004 | Williams et al. .............. 710/19 |
| 6,995,750 | B2 | 2/2006 | Albulet |
| 7,020,123 | B2 * | 3/2006 | Park et al. .................... 370/342 |
| 7,191,263 | B2 * | 3/2007 | Sankaravadivelu et al. .... 710/62 |
| 7,292,225 | B2 | 11/2007 | Gordon |
| 2006/0035590 | A1 | 2/2006 | Morris |

* cited by examiner

*Primary Examiner*—Bipin Shalwala
*Assistant Examiner*—Steven E Holton
(74) *Attorney, Agent, or Firm*—Winston Hsu

(57) ABSTRACT

A method for increasing a report rate of a wireless mouse for decreasing delay time of the wireless mouse includes selecting a packet mode, inputting data corresponding to the selected packet mode according to control signals inputted into the wireless mouse, performing a first error check operation according to a first data, performing a second error check operation according to the first error check operation and the inputted data, forming an error check block according to the second error check operation, forming a packet according to the error check block and the inputted data, and outputting the packet through a radio-frequency channel.

24 Claims, 8 Drawing Sheets

| Packet mode | Block 604 | Block 606 | Block 608 | Block 610 |
|---|---|---|---|---|
| 1st | 0 | 0 | RF ID | RF ID |
| 2nd | 0 | 1 | X-axis displacement | Y-axis displacement |
| 3rd | 1 | 0 | Scroll displacement | Switch status |
| 4th | 1 | 1 | Extended function | Extended function |

Fig. 7

METHOD AND RELATED WIRELESS MOUSE FOR DECREASING DELAY TIME OF DATA PACKET TRANSMISSION SYSTEM

CROSS REFERENCE TO RELATED APPLICATIONS

This is a continuation-in-part of application Ser. No. 10/908,076, filed Apr. 27, 2005, which is included in its entirety herein by reference.

BACKGROUND OF THE INVENTION

1. Field of the Invention

The present invention provides methods and a related apparatus for decreasing delay time of a wireless mouse, and more particularly, methods for decreasing delay time by changing a report rate of the wireless mouse.

2. Description of the Prior Art

From traditional functions, such as document processing and program operating, to modern multimedia, game playing, etc., a personal computer has become an important role in our daily life. Mouses and keyboards used for controlling the PC have improved too. As graphical user interfaces become the main stream interface, precision of a mouse becomes more and more important. In addition, with wireless communication technology, a traditional mouse, which transmits signals to a computer system with physical wires, can be replaced by a wireless mouse. However, owing to limitations of wireless communication, a report rate of the prior art wireless mouse cannot match the same level as the wired mouse. The word "report" of the report rate means that the wireless mouse transmits detected displacement and switch statuses to the computer system, while report per second, or RPS, is a term used to count the report rate, meaning how many signal counts are transmitted to the computer each second. The larger the RPS is, the more moving consistency there will be between a cursor in the monitor and the mouse in a user's hand. In general, the report rate of a wired USB mouse is between 100 Hz and 125 Hz, or between 100 and 125 report counts per second, while the report rate of the wireless mouse is between 60 Hz and 80 Hz. Therefore, the user can feel an obvious difference between the wired mouse and the wireless mouse, especially for fast moving operations, such as PC games, drafting, and web surfing.

Please refer to FIG. 1, which illustrates a block diagram of a prior art wireless mouse 100. The wireless mouse 100 includes a data receiver 102, a logic module 104, a radio-frequency transmitter 106, and a radio-frequency receiver 108. The data receiver 102 receives data pertaining to displacement and the switch status of the wireless mouse 100 and transmits the data to the logic module 104. The logic module 104 transforms data received by the data receiver 102 to packets and transmits the packets to the radio-frequency transmitter 106. Then, the radio-frequency transmitter 106 outputs the packets formed by the logic module 104 to the radio-frequency receiver 108 through a radio channel. The radio-frequency receiver 108 receives the packets outputted from the radio-frequency transmitter 106, provides the packets to a computer system, and the computer system displays effects of displacement and switch status on a monitor.

Please refer to FIG. 2, which illustrates a schematic diagram of a packet 200 outputted from a radio-frequency transmitter of a prior art wireless mouse. The packet 200 includes blocks 202, 204, 206, 208, 210, 212, and 214 with bit lengths of 1, 8, 8, 8, 8, 8, and 1 bit. So, the total bit length of the packet 200 is 42 bits. The blocks 202 and 214 indicate a start and a stop of the packet 200. The blocks 204, 206, 208, and 210 store an x-axis displacement data, a y-axis displacement data, a scroll-wheel displacement data, and a switch status data of the wireless mouse. In addition, the block 212 is an 8-bit cyclic redundancy check, or CRC, block.

In general, the prior art wireless mouse transmits signals with a technique of binary frequency shift keying, or BFSK, meaning that bits (or symbols) 1 and 0 are transmitted with two sinusoidal waves having different frequencies. Take a prior art wireless mouse with an intermediate frequency at 27 MHz for example, in which a bit 0 is represented by a 27.1 MHz sinusoidal wave, and a bit 1 is represented by a 26.9 MHz sinusoidal wave. In addition, a split-phase coding, such as a Manchester coding, has zero power at a direct-current level, and includes a zero crossing within a bit interval, which can increase correctness. Therefore, the prior art wireless mouse usually applies the Manchester coding. Please refer to FIG. 3, which illustrates a schematic waveform diagram of a prior art Manchester code. As shown in FIG. 3, transmitting one bit needs 2T duration. Therefore, if 1 T duration of transmitting time is 160 μs, transmitting a packet of the bit needs 13.44 ms (42 bit×2×160 μs=13.44 ms) with the prior art wireless mouse. In the same case, the wired mouse uses 8 ms, which is the main reason that the report rate of the wireless mouse is less than that of the wired mouse.

In short, the wireless mouse is convenient, but is limited by the low report rate and the inefficient power management.

SUMMARY OF THE INVENTION

It is therefore a primary objective of the claimed invention to provide methods and a related apparatus for decreasing delay time and power consumption of a wireless mouse.

The present invention discloses a method for increasing a report rate of a wireless mouse for decreasing delay time of the wireless mouse. The method selects a packet mode from a plurality of packet modes, inputs data corresponding to the selected packet mode according to control signals inputted into the wireless mouse, performs a first error check operation according to a first data, performs a second error check operation according to the first error check operation and the inputted data, forms an error check block according to the second error check operation, forms a packet according to the error check block and the inputted data, and outputs the packet through a radio-frequency channel.

The present invention further discloses a chip of a wireless mouse for increasing a report rate of the wireless mouse. The chip includes a reception module for receiving control signals of the wireless mouse, a logic module coupled to the reception module for selecting a packet mode from a plurality of packet modes, inputting data corresponding to the selected packet mode according to the control signals received by the reception module, performing a first error check (e.g. cyclic redundancy check, CRC) operation according to a first data, performing a second error check operation according to the first error check operation and the inputted data, forming an error check block according to the second error check operation, and forming a packet according to the error check block and the inputted data, and an output module coupled to the logic module for outputting the packet formed by the logic module to a radio-frequency transmitter of the wireless mouse for transmitting the packet to a computer system corresponding to the wireless mouse through a radio-frequency channel.

The present invention further discloses a wireless mouse capable of increasing a report rate. The wireless mouse includes a housing, a sense circuit deposited within the housing for receiving an x-axis displacement data, a y-axis displacement data, a scroll-wheel displacement data, and a switch status data of the wireless mouse, a chip coupled to the sense circuit, a radio-frequency transmitter coupled to the chip for outputting packets through a radio-frequency channel, and a radio-frequency receiver coupled to a computer system for receiving the packet from the radio-frequency transmitter and transmitting the packet to the computer system. The chip includes a reception module for receiving control signals of the wireless mouse, a logic module coupled to the reception module for selecting a packet mode from a plurality of packet modes and inputting data corresponding to the selected packet mode according to the control signals received by the reception module, performing a first error check (e.g. cyclic redundancy check, CRC) operation according to a first data, performing a second error check operation according to the first error check operation and the inputted data, forming an error check block according to the second error check operation, and forming a packet according to the error check block and the inputted data, and an output module coupled to the logic module for outputting the packet formed by the logic module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 illustrates a table of packet modes corresponding to a packet in FIG. 6.

DETAILED DESCRIPTION

Figure 5:
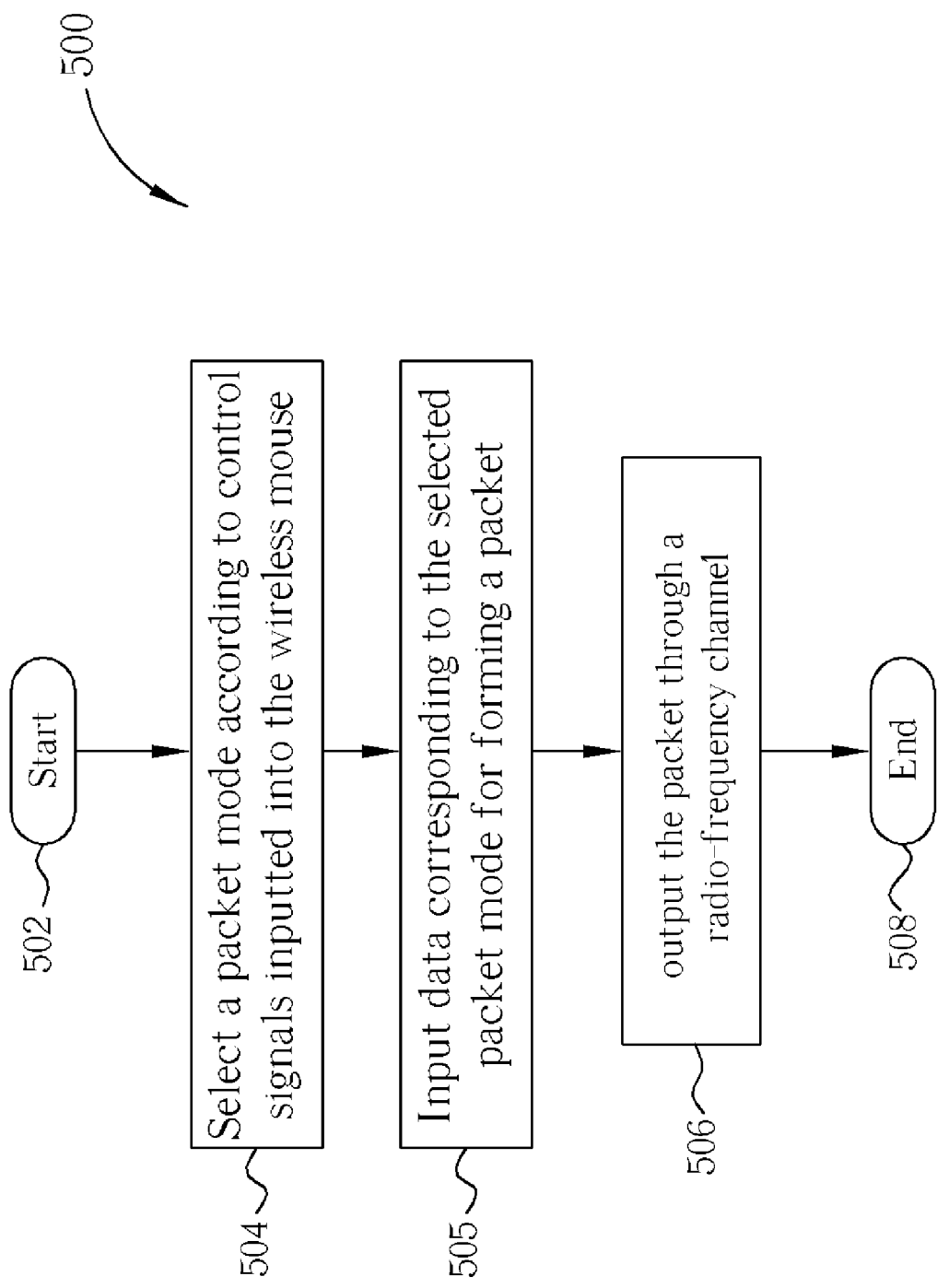
FIG. 5 illustrates a flowchart of a process for increasing a report rate of a wireless mouse in accordance with the present invention.

Please refer to FIG. 5, which illustrates a flowchart of a process 500 for increasing a report rate of a wireless mouse in accordance with an embodiment of the present invention. The process 500 includes following steps:

Step 502: start.

Step 504: select a packet mode according to control signals inputted into the wireless mouse.

Step 505: input data corresponding to the selected packet mode for forming a packet.

Step 506: output the packet through a radio-frequency channel.

Step 508: end.

Figure 6:
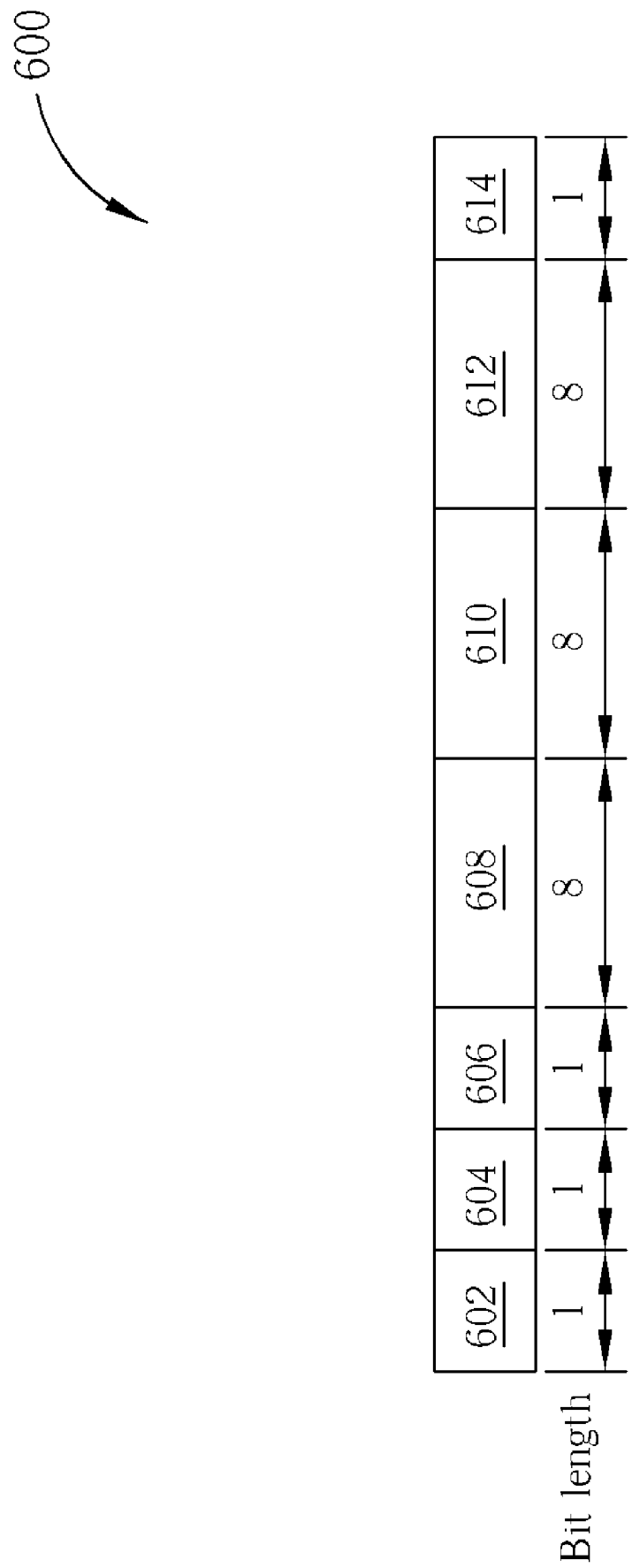
FIG. 6 illustrates a schematic diagram of an embodiment packet of a wireless mouse.

Therefore, the present invention determines a packet mode according to the control signals. For example, please refer to FIG. 6 and FIG. 7. FIG. 6 illustrates a schematic diagram of an embodiment packet 600 of a wireless mouse according to the process 500, while FIG. 7 illustrates a table 700 of packet modes corresponding to the packet 600. In FIG. 6, the packet 600 includes blocks 602, 604, 606, 608, 610, 612, and 614 with bit lengths of 1, 1, 1, 8, 8, 8, and 1 bit, so the total bit length of the packet 600 is 28 bits. The blocks 602 and 614 indicate a start and a stop of the packet 600. The blocks 604 and 606 store binary signals for indicating a packet mode, so in this case, there are four packet modes. The blocks 608 and 610 store data corresponding to the packet mode. The block 612 is an 8-bit cyclic redundancy check, or CRC, block. For example, in FIG. 7, if the blocks 604 and 606 are 0, the blocks 608 and 610 store a radio-frequency identification (RFID) data of the wireless mouse. If the block 604 is 0 and the block 606 is 1, the blocks 608 and 610 store an x-axis displacement data and a y-axis displacement data of the wireless mouse. If the block 604 is 1 and the block 606 is 0, the blocks 608 and 610 store a scroll-wheel displacement data and a switch status data of the wireless mouse. Finally, if the blocks 604 and 606 are 1, the blocks 608 and 610 store extended functions of the wireless mouse. Therefore, with the bits stored in the blocks 604 and 606, the packet 600 can be in one of four packet modes.

As shown in FIG. 6, bit length of the packet 600 is 28 bits, so if the wireless mouse transmits the packet 600 with the Manchester coding, each packet requires 8.96 ms (28 bits× 2×160 µs=8.96 ms), which is 33% faster than the prior art.

Figure 1:
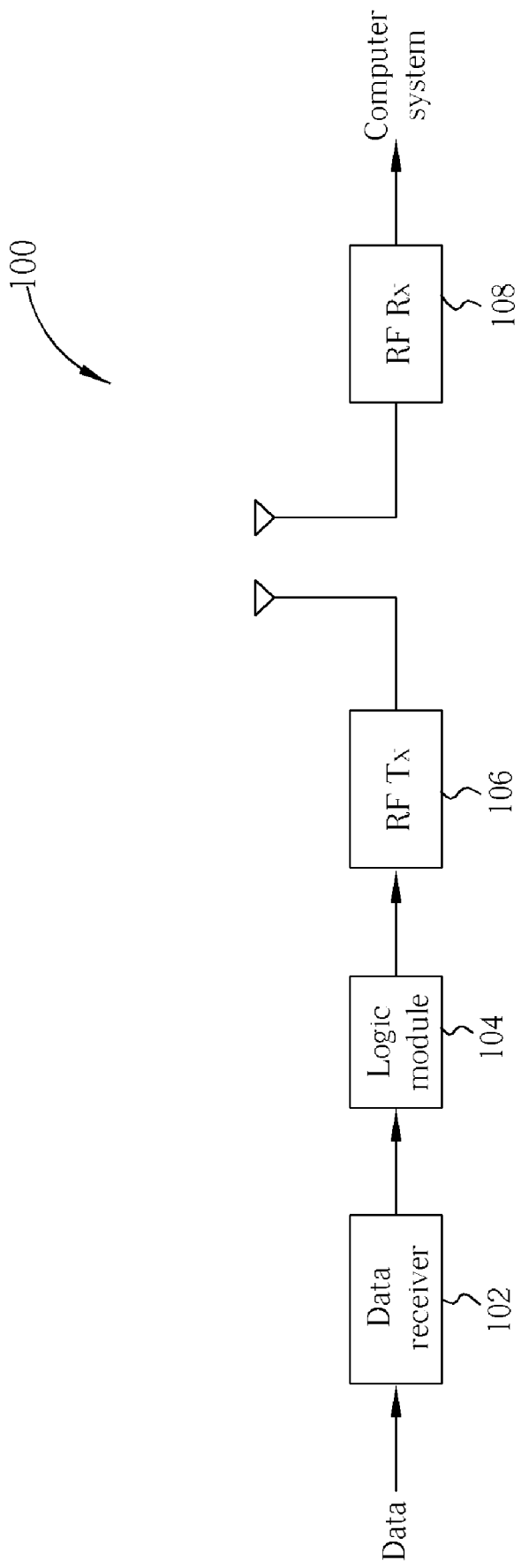
FIG. 1 illustrates a block diagram of a prior art wireless mouse.
Figure 2:
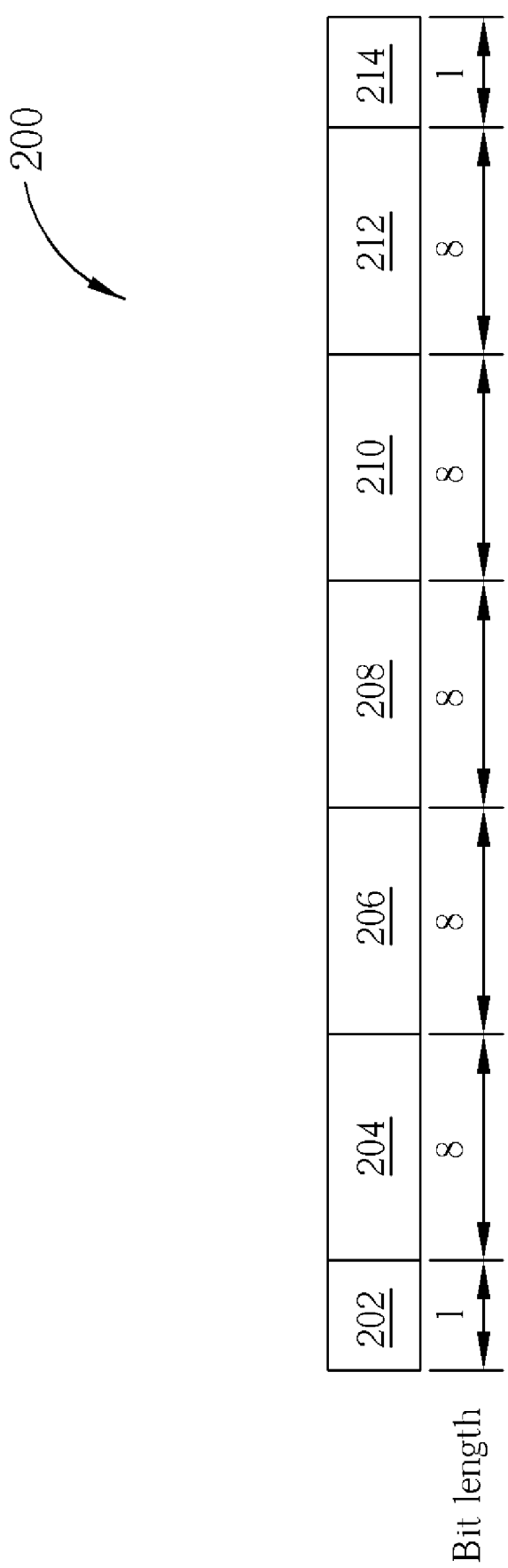
FIG. 2 illustrates a schematic diagram of a packet outputted from a radio-frequency transmitter of a prior art wireless mouse.
Figure 3:
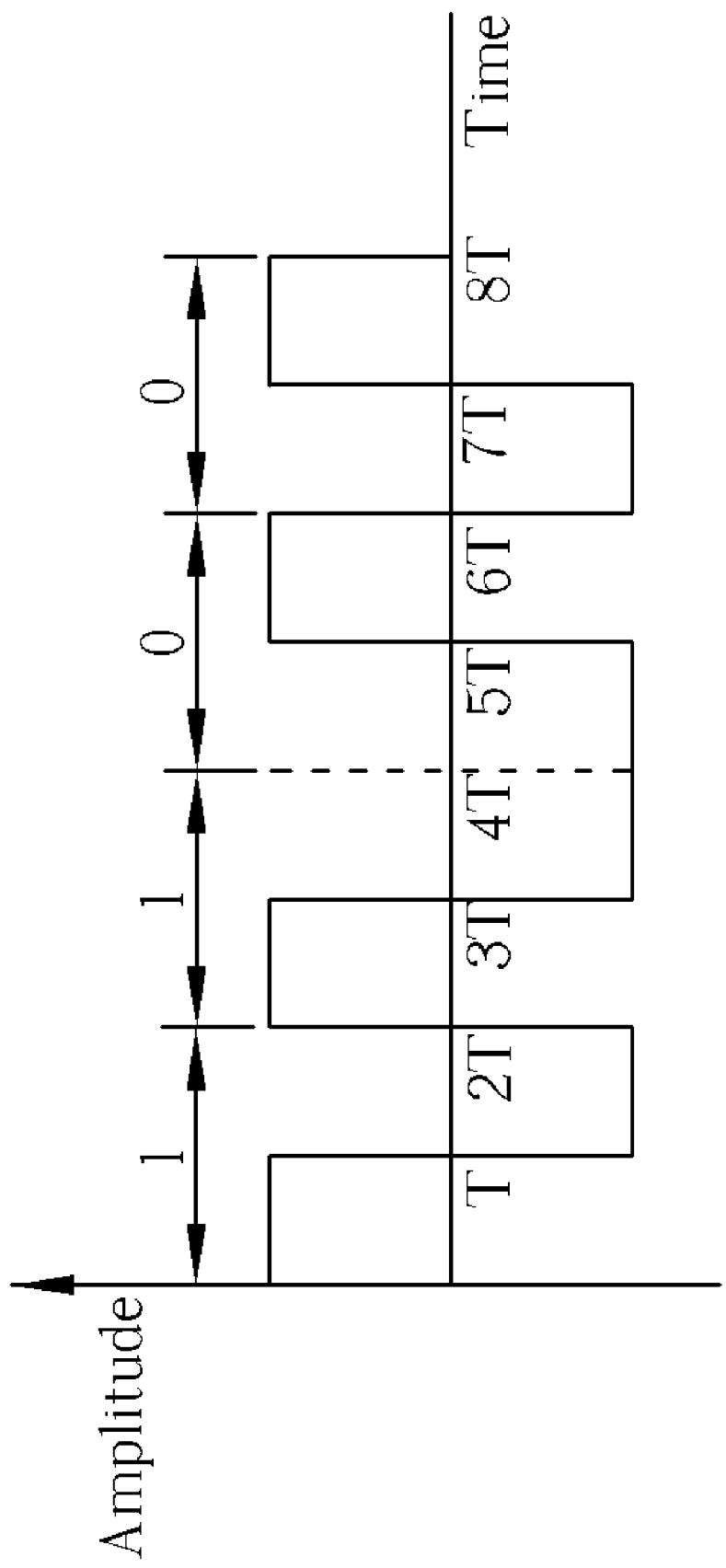
FIG. 3 illustrates a schematic waveform diagram of a prior art Manchester code.
Figure 4:
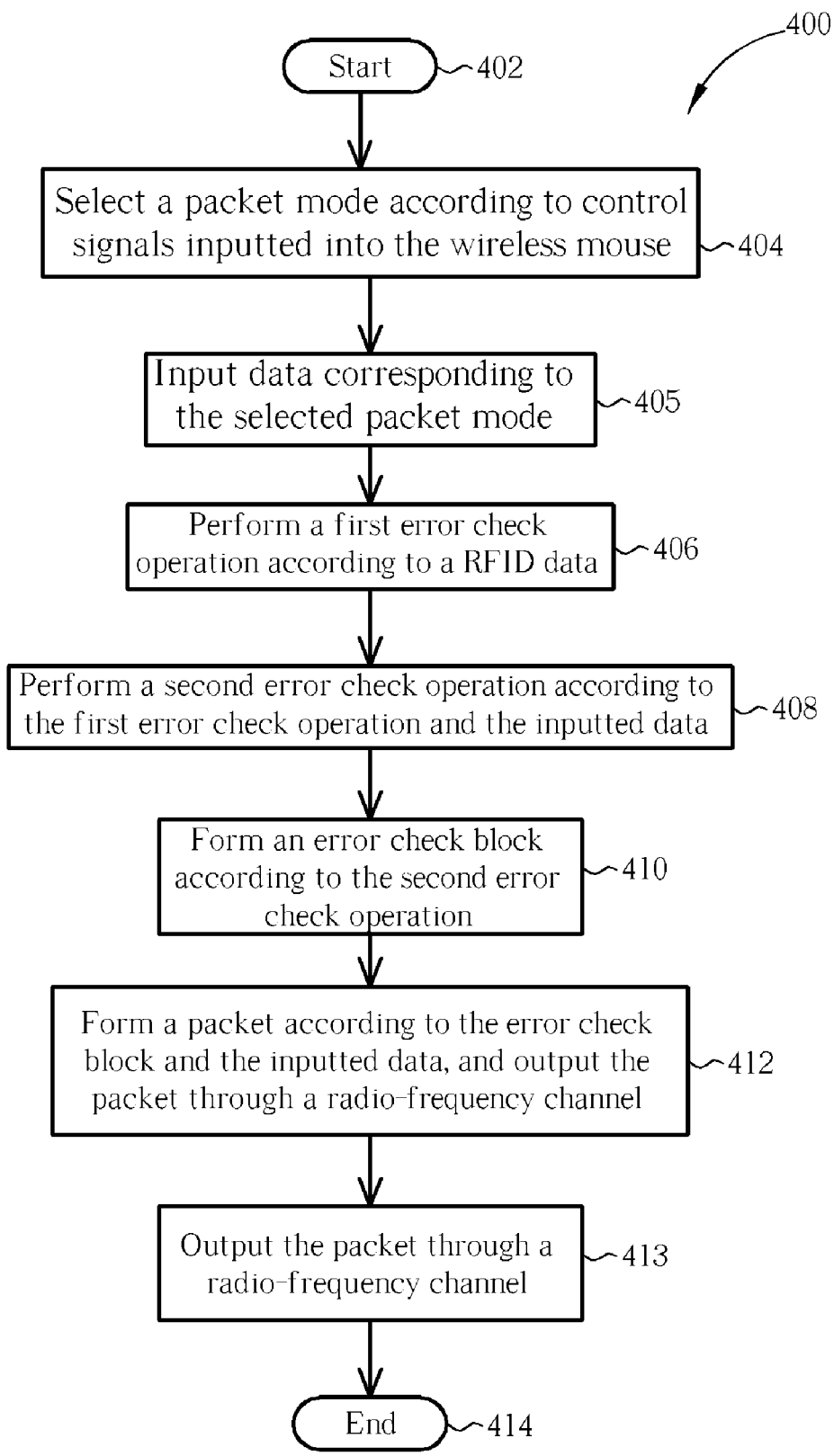
FIG. 4 illustrates a flowchart of a process for increasing a report rate of a wireless mouse in accordance with a preferred embodiment of the present invention.

As those skilled in the art recognized, the computer system can identify different wireless mouses using same radio channel according to the RFID data, so that the RFID data is not a factor affecting movement of a wireless mouse. The present invention further provides a method for integrating the RFID data into a CRC block of a packet, so as to increase a report rate of the wireless mouse. Please refer to FIG. 4, which illustrates a flowchart of a process 400 for increasing a report rate of a wireless mouse in accordance with a preferred embodiment of the present invention. The process 400 includes following steps:

Step 402: start.

Step 404: select a packet mode according to control signals inputted into the wireless mouse.

Step 405: input data corresponding to the selected packet mode.

Step 406: perform a first error check operation according to a RFID data.

Step 408: perform a second error check operation according to the first error check operation and the inputted data.

Step 410: form an error check block according to the second error check operation.

Step 412: form a packet according to the error check block and the inputted data.

Step 413: output the packet through a radio-frequency channel.

Step 414: end.

The process 400 is similar to the process 500, except that the process 400 integrates the RFID data into the error check block by performing twice error check operations. When performing a packet, the process 400 selects a packet mode, and inputs data accordingly. Then, the process 400 performs a first error check operation with the RFID data, and performs a second error check operation with the result of the first error check operation and the inputted data. In this case, the RFID data is included in the error check block, so the RFID data is not necessary to be included in a block of the packet. Note that, the first and the second error check operations can be any kind of error check operations, such as CRC operation.

Figure 8:
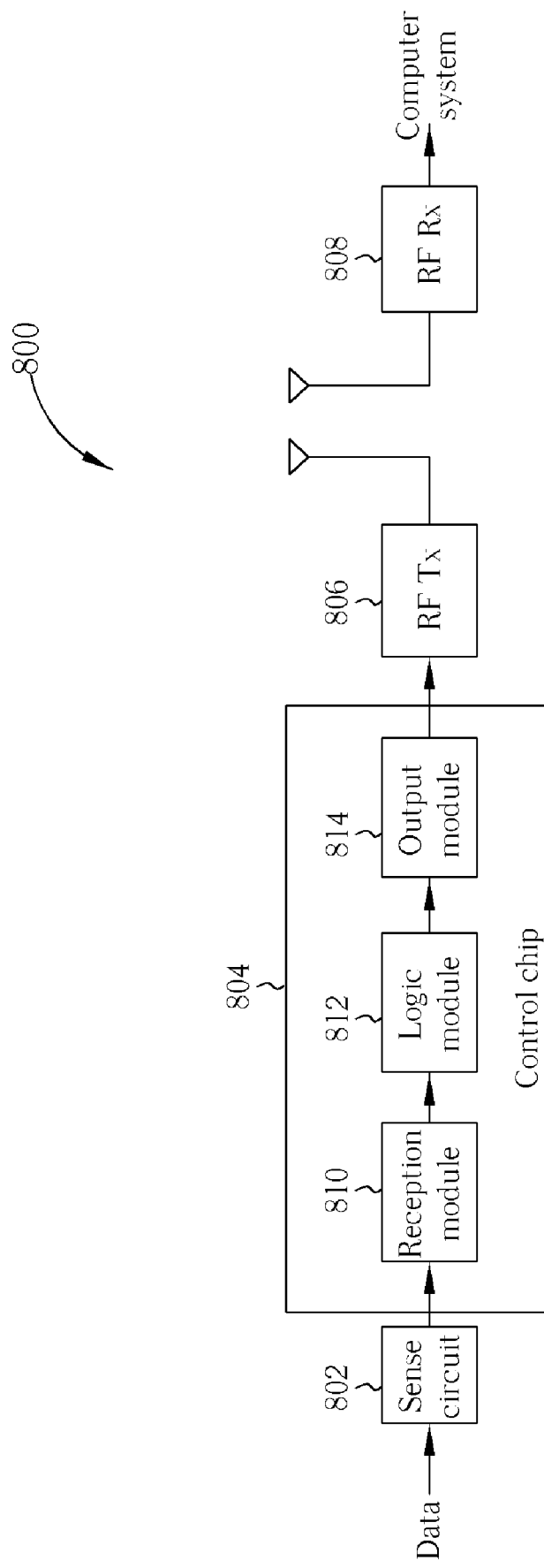
FIG. 8 illustrates a block diagram of an embodiment wireless mouse in accordance with the present invention.

Please refer to FIG. 8, which illustrates a block diagram of an embodiment wireless mouse 800 in accordance with the present invention. The wireless mouse 800 is to implement the process 400, which includes a sense circuit 802, a control chip 804, a radio-frequency transmitter 806, and a radio-frequency receiver 808. The control chip 804 includes a reception module 810, a logic module 812, and an output module 814. The sense circuit 802 receives an x-axis displacement data, a y-axis displacement data, a scroll-wheel displacement data, and a switch status data of the wireless mouse 800, and outputs to the reception module 810 of the control chip 804. According to different control signals, the logic module 812 of the control chip 804 selects a packet mode from a plurality of packet modes, inputs data corresponding to the selected packet mode according to control signals inputted into the wireless mouse, performs a first error check operation according to a RFID data, performs a second error check operation according to the first error check operation and the inputted data, forms an error check block according to the second error check operation, forms a packet according to the error check block and the inputted data, and outputs the packet to the output module 814. Then, the output module 814 outputs the packet formed by the logic module 812 to the radio-frequency transmitter 806, so as to transmit the packet through a radio channel. The radio-frequency receiver 808 receives the packet outputted from the radio-frequency transmitter 806, provides the packet to a computer system, and the computer system displays effects of displacement and switch status on a monitor. Therefore, the wireless mouse 800 transmits different packets according to different packet modes. The wireless mouse 800 can increase the report rate. For example, if the control chip 804 transmits packets according to the table 700 of packet modes, transmission time of each packet is 8.96 ms. Also, if the wireless mouse 800 transmits each bit with 132 μs, the wireless mouse 800 can reach the same report rate as the wired mouse. As a result, a user of the wireless mouse 800 will not sense any difference between the present invention wireless mouse 800 and the wired mouse.

In short, the present invention provides a method for increasing a report rate of a wireless mouse. The packet 600 in FIG. 6 and the table 700 of packet modes in FIG. 700 are merely exemplary embodiments. If the mouse needs more packet modes (the mouse includes more switches for example), the present invention can increase numbers of the control signals and corresponding packet modes. Therefore, according to the process 500, the present invention can realize a wireless mouse with a high report rate, so as to increase transmission speed, and decrease delay time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing a report rate of a wireless mouse for decreasing delay time of the wireless mouse comprising:
    (a) selecting a packet mode according to control signals inputted into the wireless mouse;
    (b) inputting data corresponding to the selected packet mode;
    (c) performing a first error check operation according to a first data;
    (d) performing a second error check operation according to the first error check operation and the inputted data;
    (e) forming an error check block according to the second error check operation;
    (f) forming a packet according to the error check block and the inputted data; and
    (g) outputting the packet through a radio-frequency channel.

2. The method of claim 1, wherein the first error check operation is a cyclic redundancy check operation.

3. The method of claim 1, wherein the second error check operation is a cyclic redundancy check operation.

4. The method of claim 1, wherein the first data is a radio-frequency identification data of the wireless mouse.

5. The method of claim 4, wherein bit length of the radio-frequency identification data is 8 bits.

6. The method of claim 1, wherein the first data comprises a block describing the selected packet mode.

7. The method of claim 1, wherein the inputted data is selected from an x-axis displacement data, a y-axis displacement data, a scroll-wheel displacement data, and a switch status data of the wireless mouse according to the control signals inputted into the wireless mouse.

8. The method of claim 1, wherein bit length of the packet is 28 bits.

9. A chip of a wireless mouse for increasing a report rate of the wireless mouse comprising:
    a reception module for receiving control signals of the wireless mouse;
    a logic module coupled to the reception module for selecting a packet mode and inputting data corresponding to the selected packet mode according to the control signals received by the reception module, performing a first error check operation according to a first data, performing a second error check operation according to the first error check operation and the inputted data, forming an error check block according to the second error check operation, and forming a packet according to the error check block and the inputted data; and
    an output module coupled to the logic module for outputting the packet formed by the logic module to a radio-frequency transmitter of the wireless mouse for transmitting the packet to a computer system corresponding to the wireless mouse through a radio-frequency channel.

10. The chip of claim 9, wherein the first error check operation is a cyclic redundancy check operation.

11. The chip of claim 9, wherein the second error check operation is a cyclic redundancy check operation.

12. The chip of claim 9, wherein the first data is a radio-frequency identification data of the wireless mouse.

13. The chip of claim 12, wherein bit length of the radio-frequency identification data is 8 bits.

14. The chip of claim 9, wherein the first data comprises a block describing the selected packet mode.

15. The chip of claim 9, wherein the inputted data is selected from an x-axis displacement data, a y-axis displacement data, a scroll-wheel displacement data, and a switch status data of the wireless mouse according to the control signals received by the reception module.

16. The chip of claim 9, wherein bit length of the packet is 28 bits.

17. A wireless mouse capable of increasing a report rate comprising:
    a housing;
    a sense circuit deposited within the housing for receiving an x-axis displacement data, a y-axis displacement data, a scroll-wheel displacement data, and a switch status data of the wireless mouse;
    a chip coupled to the sense circuit comprising:

a reception module for receiving control signals of the wireless mouse;

a logic module coupled to the reception module for selecting a packet mode and inputting data corresponding to the selected packet mode according to the control signals received by the reception module, performing a first error check operation according to a first data, performing a second error check operation according to the first error check operation and the inputted data, forming an error check block according to the second error check operation, and forming a packet according to the error check block and the inputted data; and an output module coupled to the logic module for outputting the packet formed by the logic module;

a radio-frequency transmitter coupled to the output module of the chip for outputting the packet through a radio-frequency channel; and a radio-frequency receiver coupled to a computer system for receiving the packet from the radio-frequency transmitter and transmitting the packet to the computer system.

18. The wireless mouse of claim 17, wherein the first error check operation is a cyclic redundancy check operation.

19. The wireless mouse of claim 17, wherein the second error check operation is a cyclic redundancy check operation.

20. The wireless mouse of claim 17, wherein the first data is a radio-frequency identification data of the wireless mouse.

21. The wireless mouse of claim 20, wherein bit length of the radio-frequency identification data is 8 bits.

22. The wireless mouse of claim 17, wherein the first data comprises a block describing the selected packet mode.

23. The wireless mouse of claim 17, wherein the inputted data is selected from an x-axis displacement data, a y-axis displacement data, a scroll-wheel displacement data, and a switch status data of the wireless mouse according to the control signals received by the reception module.

24. The wireless mouse of claim 17, wherein bit length of the packet is 28 bits.

* * * * *